United States Patent
Bahloul (10) Patent No.: US 11,688,194 B2
(45) Date of Patent: Jun. 27, 2023

(54) METHOD OF AUTHENTICATION OF AN IDENTITY DOCUMENT OF AN INDIVIDUAL AND OPTIONALLY AUTHENTICATION OF SAID INDIVIDUAL

(71) Applicant: Idemia Identity & Security France, Courbevoie (FR)

(72) Inventor: Sébastien Bahloul, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 443 days.

(21) Appl. No.: 16/855,440

(22) Filed: Apr. 22, 2020

(65) Prior Publication Data

US 2020/0342222 A1   Oct. 29, 2020

(30) Foreign Application Priority Data

Apr. 25, 2019 (FR) ....................................... 1904406

(51) Int. Cl.
*G06V 30/00* (2022.01)
*G06V 30/418* (2022.01)
*G07C 9/25* (2020.01)
*H04L 9/08* (2006.01)
*G06V 30/413* (2022.01)

(52) U.S. Cl.
CPC .......... *G06V 30/418* (2022.01); *G06V 30/413* (2022.01); *G07C 9/257* (2020.01); *H04L 9/0866* (2013.01)

(58) Field of Classification Search
CPC .... G06V 30/418; G06V 30/413; G07C 9/257; H04L 9/0866
See application file for complete search history.

(56) References Cited

U.S. PATENT DOCUMENTS

| 11,210,647 B2 * | 12/2021 | Maim ................ G06Q 20/3674 |
| 2004/0030932 A1 * | 2/2004 | Juels .................... H04W 12/126 713/151 |
| 2005/0269818 A1 * | 12/2005 | Forde ................... B42D 25/328 283/74 |
| 2010/0052852 A1 * | 3/2010 | Mohanty ................ G07C 9/257 340/5.83 |
| 2016/0239653 A1 * | 8/2016 | Loughlin-Mchugh ...................... G06F 21/35 |
| 2017/0236355 A1 * | 8/2017 | Chabanne ................ G07D 7/01 382/159 |

(Continued)

FOREIGN PATENT DOCUMENTS

EP   3 386 143 A1   10/2018
WO   2012/156648 A1   11/2012

OTHER PUBLICATIONS

Lavrenov, Dmitry, "A Zero-Knowledge Proof: Improving Privacy on a Blockchain", Jan. 25, 2019, 12pages.*

(Continued)

*Primary Examiner* — William L Bashore
*Assistant Examiner* — David Faber
(74) *Attorney, Agent, or Firm* — Womble Bond Dickinson (US) LLP (57) ABSTRACT

A method of authenticating an identity document based on an extraction, by analysis of an image acquired of the identity document, of candidate information representative of the appearance of a photograph such as depicted in the acquired image and optically readable data as depicted in the acquired image.

22 Claims, 1 Drawing Sheet

(56) References Cited

U.S. PATENT DOCUMENTS

| | | | | |
|---|---|---|---|---|
| 2017/0352209 | A1* | 12/2017 | Keuffer | G06F 21/32 |
| 2018/0150440 | A1* | 5/2018 | Keuffer | G06F 21/6245 |
| 2018/0270071 | A1* | 9/2018 | Feraud | G06F 21/629 |
| 2019/0034610 | A1* | 1/2019 | Miu | G06V 40/40 |
| 2019/0050546 | A1* | 2/2019 | Hochrieser | G06K 9/00906 |
| 2019/0149328 | A1* | 5/2019 | Van Der Velden | H04L 9/3226 |
| | | | | 713/171 |
| 2019/0197534 | A1* | 6/2019 | Alastair | G06Q 20/38215 |
| 2019/0205547 | A1* | 7/2019 | Horvath | G06Q 20/3674 |
| 2019/0327092 | A1* | 10/2019 | Kareti | H04L 9/3231 |
| 2020/0195636 | A1* | 6/2020 | Landrock | H04L 63/0853 |
| 2020/0210795 | A1* | 7/2020 | Pic | H04L 9/3247 |
| 2020/0259825 | A1* | 8/2020 | Van Prooijen | G06K 9/00288 |
| 2020/0302133 | A1* | 9/2020 | Ciet | B42D 25/23 |
| 2020/0311409 | A1* | 10/2020 | Luo | G06K 9/6273 |
| 2021/0117524 | A1* | 4/2021 | McKell-Redwood | |
| | | | | H04L 9/3231 |

OTHER PUBLICATIONS

Tabora, Vincent, "The Use of Self-Sovereign Identity With Zero-Knowledge Proof (ZKP)", Oct. 2, 2018, 9 pages.*

Picard et al, "Towards fraud-proof ID documents using multiple data hiding technologies and biometrics", Jun. 22, 2004, 13 pages.*

Ray, Shaan, "What are Zero Knowledge Proofs?", Apr. 15, 2019, 6 pages.*

Cossack Labs, "Explain Like I'm 5: Zero Knowledge Proof (Halloween Edition)", Oct. 26, 2017, 8 pages.*

Luciano, Adam, "zk-SNARKs—A Realistic Zero-Knowledge Example and Deep Dive", Jun. 9, 2018, 12 pages.*

Adjedj, M. et al., "Biometric Identification over Encrypted Data Made Feasible," International Conference on Information Systems Security, Springer Berlin Heidelberg, dated Dec. 14, 2009, pp. 86-100.

Correspondence from the French National Institute of Industrial Property Office (INPI—Institute National De La Propriété Industrielle) for FR1904406 dated Jan. 17, 2020; Preliminary Research Report of the French National Institute of Industrial Property Office for FR1904406 dated Jan. 10, 2020; and Written Opinion on the Patentability of the Invention issued by the French National Institute of Industrial Property Office for FR1904406, 9 pages.

English translation of Correspondence from the French National Institute of Industrial Property Office (INPI—Institute National De La Propriete Industrielle) for FR1904406 dated Jan. 17, 2020; Preliminary Research Report of the French National Institute of Industrial Property Office for FR1904406 dated Jan. 10, 2020; and Written Opinion on the Patentability of the Invention issued by the French National Institute of Industrial Property Office for FR1904406, 6 pages.

* cited by examiner

METHOD OF AUTHENTICATION OF AN IDENTITY DOCUMENT OF AN INDIVIDUAL AND OPTIONALLY AUTHENTICATION OF SAID INDIVIDUAL

CROSS-REFERENCE TO RELATED APPLICATIONS

This specification is based upon and claims the benefit of priority from French patent application number FR 1904406 filed on Apr. 25, 2019, the entire contents of which are incorporated herein by reference.

TECHNICAL FIELD OF THE INVENTION

The invention relates to methods of authentication of an identity document of an individual and authentication of said individual.

STATE OF THE ART

Holding a valid identity document (identity card, passport, driving license, Social Security card, etc.) provides evidence of the identity of an individual.

Identity documents consist of a medium generally of paper or plastic on which a photo is printed along with personal alphanumeric information (surname, given name, date of birth, etc.) of its holder. There is further a strip called MRZ (Machine-Readable Zone), which contains a code (generally two lines of 36 characters) summarizing the alphanumeric information of the document. Alternatively to the MRZ, there can be a barcode like a PDF-417 barcode containing the same information.

Generally, identity documents have a large number of high-level security features such as watermarks or holograms to prevent forgery. The lifespan of such a document is generally limited (10 or 15 years), because the appearance of its holder changes progressively and the security features evolve.

Whereupon an individual is checked by an entity, for example at the entrance of a building, he is asked to present his identity document for authentication. It is desirable that this process be as quick as possible, while still being as secure as possible. Indeed, for example the risk is that the checked individuals may have a forged identity document wherein the information has been modified, for example the photograph.

Methods known from applications FR3047688, then FR1759292 are methods of enrolling data intended to be used to automatically check the identity of an individual, and associated identity control methods, based on a very clever mechanism of generation of security data called "Digital Photo Seal" from a visual feature of an identity document (the photo in particular). This security data constitutes a sort of signature of the visual feature: images acquired from the same visual feature, irrespective of the conditions of acquisition (i.e. including using a scan or photocopy), lead to obtaining substantially identical security data. On the contrary, the slightest modification of the visual feature results in a strong variation of said security feature.

Thus, it is sufficient to store on a database of a server the "expected" reference security data for a given document, and to compare it with the "candidate" generated from a copy of said document, to determine if the visual feature of this document is real or not.

In particular, to guarantee the security of the reference data on the server, those data are "masked" by application of an encoding process (typically like a secure sketch process) to the reference data and to random data, and the masked reference data is stored in the database with a cryptographic footprint, i.e. a hash, of a concatenation of the MRZ with said random feature.

Thus, an identity document presented by an individual can be authenticated on the base of its MRZ and the photograph: candidate security data are obtained from the photograph of the presented document, and it is then possible, by application of a decoding process, to recover the random data if the photograph of the presented document is identical to the one on the basis of which the reference security data was generated, and to verify that the hash of a concatenation of the MRZ with said random data corresponds to the one stored.

This solution is entirely satisfactory. It has even been proposed recently in application FR1904375 to store alphanumeric data on the server as well, in particular the data called "visual," i.e. the data printed on the identity document such as the civil status data (surname, given name, address, date of birth, etc.) or technical data such as the expiration date of the identity document, encrypted to guarantee the privacy of the individual. This avoids manually retyping these data, if needed.

However, it is noted that although the stored data of the individual remain encrypted and are therefore inaccessible, it is still necessary to send an image of the identity document that, in a certain way, includes all these personal data, even though the department potentially only requires a subset. Moreover, a hacker could attempt to intercept the data that are sent to it, and to access the photograph of the individual or the personal information visible on the image of the identity document.

It would therefore be desirable to have a simple, reliable, secure solution for authentication of an identity document that is totally respectful of privacy.

It would further be desirable to be able to authenticate the individual who carries the identity document.

BRIEF DESCRIPTION OF THE INVENTION

According to a first aspect, the invention relates to a method of authentication of an identity document carried out by a server and connected a client device; the client device having a first encoded data and an acquired image of said identity document representing at least a photograph of an individual and optically readable data that are visible on said identity document, and the server having a cryptographic footprint of a first concatenation of said optically readable data from said identity document and a first random data, called first cryptographic footprint;

the method being characterized in that it comprises the implementation of steps of:

(b) extraction, by the client device's data processing means, by analysis of said acquired image of said identity document, of:

a candidate information representative of the appearance of said photograph as depicted in the acquired image;

said optically readable data as depicted in the acquired image;

(c) calculation by the client device's data processing means of:

a first decoded data by application of a decoding process to said candidate information representative of the appearance of said photograph, and to the first encoded data, such that said first decoded data corresponds to the first random data if said candidate information representative of the appearance of said photograph matches reference information representative of the appearance of said photograph;

a cryptographic footprint of a first concatenation of the extracted optically readable data and of the first decoded data;

(d) generation by the client device's data processing means of a zero-knowledge proof of the calculation of said cryptographic footprint from the first concatenation of the extracted optically readable data and of the first decoded data;

(e) transmission to the server of said zero-knowledge proof and of the computed cryptographic footprint;

(f) verification by the server's data processing means that:
the zero-knowledge proof is valid, and
the received cryptographic footprint matches said first cryptographic footprint possessed by the server.

According to other advantageous and nonlimiting characteristics:

the method comprises a step (a) of preliminary acquisition of said image of said identity document representing at least a photograph of an individual and optically readable data visible on said identity document by the client device's optical acquisition means; the client device initially has neither the first encoded data nor the acquired image of said identity document, the step (b) comprising the reception by the client device of the first encoded data from the server;

said zero-knowledge proof of the calculation of said cryptographic footprint from the first concatenation of the extracted optically readable data and of the first decoded data is a zero-knowledge proof of the fact that, given a cryptographic footprint, there is an optically readable data and a first random data such that the first concatenation thereof has as said footprint said cryptographic footprint the method comprises a prior step (a0) of enrollment of data from said identity document comprising the sub-steps of:

(A) Obtaining the photograph of said individual visible on said identity document and of the optically readable data from the identity document;

(B) Extracting by analysis of said photograph reference information representative of the appearance of said photograph;

(C) Generating the first random data; calculating the first encoded data by application of an encoding process to said reference information representative of the appearance of said photograph and to said first random data, and of the first cryptographic footprint; the step (a0) further comprises a sub-step (D) of storing on the server's data storage means the first encoded data and the first cryptographic footprint;

the method is further a method of authentication of the individual, wherein the step (d) comprises the generation by the client device's data processing means of a zero-knowledge proof of the fact that reference biometric data and candidate biometric data of the individual match; the step (e) comprising the transmission to the server of said zero-knowledge proof of the fact that the reference biometric data and the candidate biometric data of the individual match; and the step (f) comprising the verification by the server's data processing means that the zero-knowledge proof of the fact that the reference biometric data and the candidate biometric data of the individual match is valid; the client device further has a second encoded data and candidate biometric data of the individual, and the server has a cryptographic footprint constructed from second random data, called third cryptographic footprint; the step (c) comprising the calculation by the client's data processing device of:

a second decoded data by application of a decoding process to said candidate biometric data and to the first encoded data, such that said second decoded data corresponds to the second random data if said candidate biometric data matches the reference biometric data;

a cryptographic footprint constructed from the second decoded data in the same way as the third cryptographic footprint is constructed from the second random data;

said zero-knowledge proof of the fact that the reference biometric data and the candidate biometric data of the individual match being a zero-knowledge proof of the calculation of said cryptographic footprint from the first concatenation of the extracted optically readable data and of first decoded data; the step (e) further comprising the transmission to the server of the computed cryptographic footprint; and the step (f) further comprising the verification by the server's data processing means that the received cryptographic footprint matches said third cryptographic footprint in the possession of the server;

during the step (a0), the sub-step (A) or the sub-step (B) comprises obtaining said reference biometric data; and the sub-step (C) further comprises the generation of the second random data and the calculation of the second encoded data by application of said encoding process to said reference biometric data and to said second random data, and of the third cryptographic footprint;

the third cryptographic footprint is the cryptographic footprint of a concatenation of the second random data and the first cryptographic footprint;

the step (a) further comprises the generation of the candidate biometric data from a biometric trait furnished by biometric acquisition means;

the biometric acquisition means are the client device's optical acquisition means, the client device being electronic equipment personal to said individual, particularly like the mobile device or chip card;

the decoding process is a process complementary to a process using an algorithm like "secure sketch";

the optically readable data of the identity document is data like MRZ, QR code or PDF417; the step (f) further comprises the transmission to the server of target personal data of the individual, the zero-knowledge proof of the calculation of said cryptographic footprint from the first concatenation of the extracted optically readable data and of the first decoded data as well as a proof of the fact that at least a target personal data to be transmitted is selected from among personal data associated with the identity document;

the client device further has an encryption with the cryptographic footprint of a second concatenation of the optically readable data from the identity document and of the first random data, different from the first concatenation, of at least one personal data of said individual, said second concatenation; the method comprising the decryption of the encryption of the at least one personal data of said individual, by means of the cryptographic footprint of the second concatenation of the extracted optically readable data and of the decoded data;

said target personal data is either extracted from the optically readable data, or from the at least one encrypted personal data;

said one personal data of said individual is an alphanumeric data associated with said individual, said photograph of the individual, said optically readable data, and said at least one alphanumeric data being printed on the identity document;

the reference information representative of an expected appearance of said photograph is security data like Digital Photo Seal;

the zero-knowledge proof(s) is(are) a cryptographic object like zkSNARK.

According to a second aspect, the invention relates to an authentication arrangement comprising a server and a connected client device, characterized in that:

the client device comprises data processing means configured for:

Extracting, by analysis of an acquired image of an identity document representing at least a photograph of an individual and optically readable data that are visible on said identity document:

candidate information representative of the appearance of said photograph as depicted in the acquired image;

said optically readable data as depicted in the acquired image;

Calculating:

a first decoded data by application of a decoding process to said candidate information representative of the appearance of said photograph and to the first encoded data, such that said first decoded data corresponds to first random data if said candidate information representative of the appearance of said photograph matches reference information representative of the appearance of said photograph, the server possessing a cryptographic footprint of a first concatenation of said optically readable data from said identity document and said first random data, said first cryptographic footprint;

a cryptographic footprint of a first concatenation of the extracted optically readable data and of the first decoded data;

generating a zero-knowledge proof of the calculation of said cryptographic footprint from the first concatenation of the extracted optically readable data and of the first decoded data;

transmitting to the server of said zero-knowledge proof and the computed cryptographic footprint;

the server comprising data processing means configured for verifying that the zero-knowledge proof is valid, and the received cryptographic footprint matches said first cryptographic footprint possessed by the server.

According to a third and a fourth aspect, the invention relates to a computer program product comprising coding instructions for the execution of a method according to the first aspect of authentication of an identity document; and a storage means readable by computer equipment on which a computer program product comprises coding instructions for executing a method according to the first aspect of authentication of an identity document.

DESCRIPTION OF THE FIGURES

Other characteristics, purposes and advantages of the present invention will be seen from the following detailed description with regard to the appended FIGURES, provided by way of nonlimiting example, and wherein.

DETAILED DESCRIPTION

Architecture

This invention relates to a method of authentication of an identity document 1 of an individual, possibly including a method of enrollment of information from said identity document 1. According to a preferred embodiment which will be disclosed hereinafter, in addition, this method is a method of authentication of said individual, i.e. it makes it possible to verify, if the document 1 has been validly authenticated, that the bearer thereof is truly the individual whose identity is presented by the document 1. In fact, there are two possible levels of fraud:

The first one is the forgery of the identity document, for example by changing the photograph, The second one is identity theft, for example a thief using a valid identity document 1 as his own.

The authentication of the document 1 allows the first level of fraud to be detected and the authentication of the individual makes it possible to detect the second level of fraud.

Figure 1:
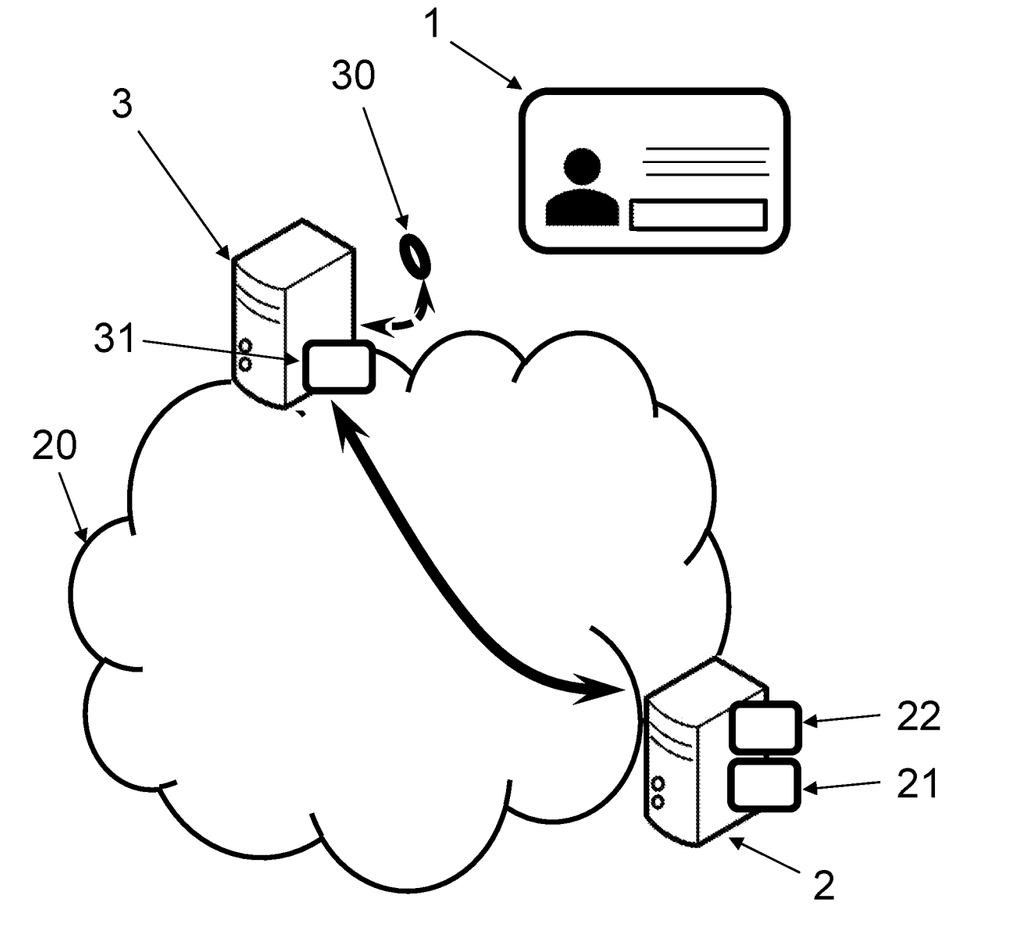
FIG. 1 is a diagram of system for implementation of the methods according to the invention.

Referring to FIG. 1, represented schematically is an architecture for an authentication system for implementing these methods. Said system comprises at least one identity document 1, a server 2 and a client device 3 connected to the server 2 via a network 20 such as the Internet.

The identity document 1 is an object that is personal to an individual (numerous individuals can each possess such an identity document), and it constitutes an official certificate advantageously issued by a government agency. Said document can take numerous forms such as an identity card or a passport, and can possibly be electronic. According to one embodiment, it takes the form of a chip card (such as a "smart card") of standard dimensions and generally made of PVC or polycarbonate. In every case, the identity document 1 has a solid surface on which a certain amount of information is printed, and in particular:

A photograph of the individual holder of the card (and possibly other "graphic" data such as a signature of the individual);

optically readable data (i.e. automatically readable, intended for computers), such as MRZ, QR code or PDF417 (the example of MRZ will be used in the rest of the document, but it will be understood that it is not limited to optically readable data like this);

A variety of alphanumeric data, called "visual data," in particular selected from among:

Complete number of the identity document 1;
Expiration date;
Date of issue;
Surname;
Given name(s);
Nationality;
Date of birth;
Place of birth;
Sex;
Height;
Address;
etc.

The server 2 is remote equipment, secure, typically of an authority or a security solution supplier. It comprises data processing means 21 (processor type) and data storage means 22 (a memory, for example a drive).

The client device 3 is a local terminal including or connected to optical acquisition means 30 (typically a photography apparatus or a scanner), and suitable for acquiring an image (of the document 1 as will be seen). It further comprises data processing means 31 and data storage means

32. The client device 3 and the server 2 advantageously comprise communication interfaces enabling them to dialog remotely. Preferably, the client device 3 is a personal device of the individual bearer of the identity document 1, for example a mobile terminal of the individual (particularly like a smart phone).

Preferably, in the case of an authentication of the individual, the client device 3 is capable of generating biometric data from a biometric trait of the individual. The biometric trait can, for example, be the shape of the face, a footprint, a palm print, an iris of the individual, etc. The extraction of the biometric data is performed by processing the image of the biometric trait, which depends on the nature of the biometric trait. Methods of processing a variety of images in order to extract biometric data are known to the skilled person. By way of nonlimiting example, the extraction of the biometric data can comprise an extraction of particular points or of a shape of the face in the case where the image is that of the individual's face.

The client device 3 comprises or is connected for this purpose to biometric acquisition means, typically an image sensor, and in a particularly preferred way, said biometric acquisition means are optical acquisition means 30, for example a photographic apparatus adapted to acquire a photograph of the face in "selfie" mode (it will be noted that alternatively different acquisition means can be used, such as a fingerprint sensor).

In every case, reference biometric data used for the optional authentication of the individual is advantageously data pre-recorded in the presence of an authority (see below), or data from the identity document 1 such as the photograph.

It should be noted that there can be numerous variants of the device 3. More specifically, and as will be seen, it is sufficient for the implementation of the invention that the client device 3 be able to obtain an image acquired from the identity document 1 in one way or another, including indirectly, and to process said image.

As has been explained, in every case the client device 3 is able to acquire an image of an image of the identity document 1, i.e. to photograph a photocopy rather than the document 1 directly, or even a photocopy of a photocopy, etc. As will be seen, it will be sufficient that the acquired image represents the document 1. It will be understood that this method is in no way limited to obtaining said image nor to any type in particular (the acquired image can be in black and white, distorted, etc.).

As will be seen, according to a known but unusual identity document authentication plan, the client device 3 is an entity, called proof, which implements the authentication of the identity document 1 (and even of the individual) and furnishes the result to the server 2, called the verification entity, which verifies said result.

It will be noted that it is quite possible for other entities to be connected to the server 2 and to the device 3, in particular servers performing services using the statements produced by the device 3, i.e. services needing authentication of the document 1, for example a server of a bank, a hotel, etc.

Digital Photo Seal

In a known way, these methods use information representative of an appearance of a photograph (or another graphic feature from the document 1), i.e. descriptive data of at least a fragment of said photograph as it appears, i.e. a "signature" which will enable comparisons.

"Reference" information is considered to be information representative of the "theoretical" appearance of the photograph, i.e. as expected. By contrast, "candidate" information is considered to be information representative of the observed appearance of the photograph, i.e. as depicted in an acquired image of the document 1. It will be understood that said observed appearance is generally not perfectly identical to the expected appearance, due to the conditions of the defects inherent in the acquisition of an image, and to the variability of conditions of taking the shot (lighting, shaking, distance, etc.).

Nevertheless, said information representative of the appearance is chosen in such a way that if two photographs have appearances that match (i.e. it involves the same photograph even if the conditions in which the shot was taken are not identical), then the representative information thereof matches further (i.e. they have a difference according to a given metric that is less than a threshold).

Thus, the reference information and the candidate information match if and only if the observed appearance and the expected appearance of the photograph match, i.e. it is indeed the same photograph. In other words, the photograph printed on the identity document 1 has not been fraudulently altered. This verification can be done for every other graphic feature such as a signature.

The "Digital Photo Seal" (DPS) can be used as information representative of the appearance of the photograph that will be used as an example in the remainder of this application, i.e. the security data as disclosed in the applications cited in the introduction, or more specifically, the application EP3206192, based on the position of singular points of the graphic feature, or any other "signature" of a graphic object such as a photograph.

The DPS of a photograph is a characteristic of that image that is not a biometric model, and for example can comprise a histogram of oriented gradients (HOG descriptor algorithm). Alternatively, a classification algorithm can be used like those using a convolutional neural network, further known by the acronym CNN.

Enrollment

This method intends to ensure that the server 2 (the verification entity) needs only to have proof of the authentication of the identity document 1 presented to it (and optionally proof of the authentication of the individual), but no usable data much less any personal data.

Thus, the base predicate is that at the start of the method the proof entity (the client device 3) has at least one image acquired of said identity document 1 representing at least a photograph of an individual and optically readable data visible on said identity document 1 (wherein the personal data of the individual are readable), without any of these data needing to be transferred to the server 2.

Furthermore, the client device 3 needs to have a first "encoded data" (denoted SSKD) obtained by application of a process for encoding the DPS reference information representative of the appearance of the photograph of said individual visible on said identity document 1 and first random data (denoted RNGD). In practice, said first encoded data is generally stored by the server 2.

The server 2 only needs to have a cryptographic footprint of a first concatenation of the optically readable data from the identity document 1 and the first random data RNGD.

Optionally, the client device 3 can have an encryption with a cryptographic footprint of a second concatenation of the optically readable data from the identity document 1 and of the first random data RNGD, different from the first concatenation, of at least one personal data of the individual (again, the encryption is often stored by the server 2).

It will be understood that none of said data are for use as such (especially if they are all stored on the server 2) because:

Said first encoded data SSKD alone does not allow the reference DPS information or the first random data RNGD to be retrieved;

the cryptographic footprint of a first concatenation of the optically readable data of the identity document 1 and of the first random data RNGD is a simple footprint having no information;

the encryption of the personal data cannot be read by anyone without the key.

In a preferred embodiment, the method comprises a preliminary step (a0) of "enrollment" enabling an individual and his identity document 1 to be included, and of generating the data that the server 2/client device 3 must have.

This step can be carried out long before the rest of the method, and does not need to be repeated at each occurrence of the method (it should be noted that it can be repeated from time to time for security and to make personal updates, but that remains optional). Thus, it can be considered that said data referenced above are predefined for the implementation of the method.

Said method of enrollment of data from the individual's identity document 1 can be done by the server 2 or by the server of a government authority, and the data obtained are then transmitted to the server 2 and/or to the client device 3.

The enrollment begins by a step (A) of obtaining a photograph of said individual visible on said identity document 1, optically readable data from the identity document 1, and if applicable at least some personal data of the individual, in particular an alphanumeric data associated with said individual, although it is further possible to take any other data relative to the person such as a biometric template or an identification proof (see below). Preferably, said personal data are alphanumeric data associated more specifically with the identity document 1, especially "visual data" printed on the document 1 as previously indicated, but it will be understood that it can further involve an email address, an access identifier, etc., which are not necessarily printed on the document 1.

This step (A) can itself be implemented by means of an image from the identity document 1 (as will be explained for the authentication method), but preferably, in order to avoid problems of scanning and loss of quality, said data (i.e. the photograph, the optically readable data and/or the personal data) are handled directly, particularly if the enrollment is carried out by a government authority. Moreover, this enables a possible updating of the data (see below).

In a step (B), the extraction of the reference information (denoted DPS for convenience, although as explained this method is not limited to Digital Photo Seal) that is representative of the appearance of said photograph, is performed by analysis of said photograph by means of a known algorithm.

Then, in a step (C) the first random data RNGD is generated in such a way as to compute the first encoded data (denoted SSKD, for SSK-DATA for convenience, although as explained this method is not limited to secure sketch) by application of an encoding process to said reference DPS information representative of the appearance of said photograph and to said first random data RNGD, i.e. SSKD=enc (DPS, RNGD).

The first random data RNGD are, as the name indicates, data of random value providing the random feature, which is important because knowledge thereof will make it possible to prove that one actually has the identity document 1.

Preferably, the encoding process is an algorithm like "secure sketch". Said sketch process is known to the skilled person. It is particularly disclosed in the document "Fuzzy Extractors: How to Generate Strong Keys from Biometrics and Other Noisy Data", by Dodis et al. (see definition 3 provided on page 11 of this document).

However, other encoding processes can be used by the processing unit 4 instead of a sketch process (for example processes of an algorithm like "fuzzy extractor" algorithm, and fuzzy logic in general).

It should be noted that the encoding process can be applied directly to said reference information representative of the appearance of said photograph, but further indirectly, i.e., to data derived from said reference information in order to add entropy. For example, a combination of reference information with the optically readable data can be used as derived data, particularly a certain number of first bits of the cryptographic footprint thereof (see below). In particular, this combination can be an XOR, i.e. XOR(DPS;HMRZ), HMRZ being the n first bits of the cryptographic footprint of the optically readable data (in the example where it is the MRZ) where n is the number of bits of the reference information (the same number of bits is necessary for the XOR).

In any case, the encoding process allows the first random data RNGD to be masked by the result of the DPS processing of the photograph, but retrievable by means of a decoding process complementary to the encoding process.

whereupon the encoding process used for the enrollment is an algorithm like the secure sketch algorithm, the decoding process is the recovery process of the same secure sketch algorithm. Such a recovery process is further known to the skilled person (see definition 3 provided on page 11 of the above mentioned document "Fuzzy Extractors: How to Generate . . . ")

More specifically, if DpsRef is the reference information and DpsCand a candidate information (with SSKD=enc (RNGD,DpsRef), then the encoding and decoding processes are such that if DpsCand is sufficiently close to DpsRef (i.e. different by less than a threshold amount, which is normally the case if one extracts the representative information from the same photograph as the one from which the reference information was generated, even though it remains impossible that the two values match, there will always be |DpsCand−DpsRef|>0) then the decoded data are equal to the first random data RNGD.

On the contrary, if DpsCand is not sufficiently close to DpsRef, then the first decoded data is not the correct value of the first random data.

Mathematically, for a value of the first encoded data SSKD and for a candidate information value DpsCand, the decoding process gives "the value x=dec(SSKD, DpsCand) such that there is a standard value ε less than a given threshold verifying SSKD=enc(x,DpsCand+ε)," x being equal to the value of the first random data RNGD if we have RpdCand+ε=DpsRef.

It will be remembered that such encoding and decoding processes are known to the skilled person, and can have numerous embodiments. Moreover, it will be possible to increase the entropy of the encoded data by applying the encoding process to more data than just the information representative of the appearance of said photograph and the first random data.

Lastly, in a step (D) the following are stored in the data storage means 22 of the server 2 and/or the data storage means 32 of the client device 3 (optionally after transmission):

Said first encoded data SSKD;

The cryptographic footprint of a first concatenation of the optically readable data of the identity document 1 and of the first random data RNGD;

The potential encryption with the cryptographic footprint of a second concatenation of the optically readable data from the identity document 1 and of the first random data RNGD, different from the first concatenation, of the at least one personal data of the individual.

Whereupon these data are stored on the server 2, they can be indexed in the memory 22 with a cryptographic footprint of an identifier of the identity document 1, generally obtained from the MRZ.

Cryptographic footprint, or hash, is understood as the result of a predetermined cryptographic hashing function.

Preferably, the first and second concatenations correspond to concatenations in two different directions, for example MRZ|RNGD for the first concatenation and RNGD|MRZ for the second concatenation, but any other construction can be used such as two concatenations in the same order but including a predetermined character in the middle, for example MRZ|1|RNGD and MRZ|2|RNGD.

It is understood that the optically readable data from the identity document 1 and the first random data RNGD can be considered as sequences of bits. Thus, the number of bits of the concatenation is the sum of the number of respective bits of the optically readable data from the identity document 1 and of the first random data RNGD.

For convenience, said cryptographic footprint of the first concatenation (h(MRZ|RNGD) in particular) is called first footprint, and the cryptographic footprint of the second concatenation (h(RNGD|MRZ) in particular) is called the second footprint.

The ingenuity of these multiple concatenations enables the formation of a plurality of completely independent footprints from the same data. Indeed, knowing the first footprint, which is stored in the memory 22 and which could therefore be obtained by a hacker), it is impossible to obtain the second footprint. It is still necessary to obtain said second footprint to have the value of the first random data RNGD, which can only be retrieved by having the reference information.

Thus, the personal point of data or data encrypted with the second cryptographic footprint (i.e. the second footprint is used as key) remain accessible only to the holder of the identity document 1, so that the server 2 cannot manipulate or know the user's personal data, which can be stored in complete security.

The first footprint can be associated in the server 2 with a descriptor of the status of the identity document 1, for example "OK," "Expired" or "KO".

It should be noted that the enrollment method can be repeated at regular intervals in order to verify or update the personal data. Recent and reliable data can be retrieved from a government entity. Furthermore, an identity document 1 has only a limited lifespan, and must be renewed regularly.

According to the preferred embodiment further enabling the authentication of the individual bearer of the identity document 1, the client device 3 advantageously also has a second encoded data (called SSKT, for SSK-TEMPLATE) obtained by application of a process for encoding (typically the same encoding process as for the first encoded data) reference biometric data and second random data (called RNGT); and the server 2 further has a cryptographic footprint constructed from the second random data RNGT. Again, all said data can be stored on the data storage means 22 of the server 2 (and associated with other data).

Said cryptographic footprint constructed from the second random data RNGT, called third cryptographic footprint, can be a cryptographic footprint directly from the second random data RNGT, or from any function (for example a concatenation) of the second random data RNGT, and from other data, advantageously from the first cryptographic footprint (the cryptographic footprint of a first concatenation of the optically readable data from the identity document 1 and from the first random data RNGD).

Once again, it should be understood that none of these data are for use as such because:

Said second encoded data SSKT alone does not allow the reference biometric data or the second random data RNGT to be retrieved;

The cryptographic footprint constructed from the second random data RNGT is a simple footprint offering no information.

In one such embodiment, the step (a0) of enrollment can further comprise:

In step (A) or in step (B), the obtaining of said reference biometric data (called TempRef for reference template), for example from the photograph of the identity document 1;

In step (C), the generation of the second random data RNGT so as to compute the second encoded data SSKT by application of said encoding process, i.e. SSKT=enc (TempRef, RNGT);

In step (D), the storage on the data storage means 22 of the server 2 and/or the data storage means 32 of the client device 3 (if applicable, after transmission) of said second encoded data SSKT and of the cryptographic footprint constructed from the second random data RNGT.

It should be noted that these additional actions related to the biometric enrollment can be carried out in new steps (A') to (D'), i.e. not necessarily simultaneously with the actions related to the enrollment of the identity document 1.

Furthermore, it is still possible to carry out a method of authentication of the individual without needing second random data RNGT and second encoded data SSKT, particularly by using the reference biometric data as personal data, encrypted by means of the second cryptographic footprint.

Authentication of the Identity Document

It is assumed at present that the enrollment has been successfully completed, and that the identity document is at present usable.

In a preferred embodiment, the authentication method begins by a step (a) of acquisition in one way or another (for example by the acquisition means 30 of the client device 3) of an image of the identity document 1, the image representing at least the photograph of the individual and the optically readable data from the identity document 1 (the MRZ) that are visible on said identity document 1. Preferably, said image represents the whole identity document 1, at least all of one face. As explained, it may be necessary to acquire more images, for example in order to see all the faces.

Typically, it is the individual who takes a photo of his identity document 1 with his mobile terminal.

A disclosure will at present be provided of the principal part of the method of authentication of an individual presenting an identity document 1 as being his own, and for that purpose furnishing an acquired image of said identity document 1.

The objective is to verify that the step (a) has taken place correctly as disclosed previously, and that it is not a forgery (for example an image that had been fraudulently modified). The individual or any other entity who wishes the authentication of the document 1 wishes to prove that of the server 2.

In a step (b), the data processing means 31 of the client device 3 analyze the image, so as to extract:
- candidate information (DPS) representative of the appearance of the photograph as depicted in the acquired image;
- the optically readable data from the identity document 1.

The extraction of the candidate information comprises identifying the photograph that appears in the image and obtaining the candidate information in the same way as the reference information was obtained during enrollment. The identification of the photograph can be done using models and masks (indeed, identity documents always have the same organization), and thus, the analysis of the image can comprise the recognition of a contour of the identity document 1, the reframing of said contour, and the application of predetermined masks. For this purpose, suitable convolutional neural networks can be cleverly used. Similarly, as regards the optically readable data, there are algorithms enabling the automatic extraction thereof, in particular because zones like MRZ zones are especially designed to be read easily by a computer.

Once the photograph has been "isolated" in the image, the same algorithms are applied as those that were applied to the original photograph in order to obtain the candidate information representative of the appearance of the photograph as represented. It will be understood that the reference and candidate information must be obtained in an identical way in order to be compared.

Preferably, step (b) comprises the querying of the server 2 so as to recover at least said first encoded data SSKD if it is stored on said server 2 (the other data that can be requested will be seen further on), for example by supplying it with the cryptographic footprint of the identifier of the document 1 (said identifier being obtainable from the MRZ for example). The server 2 transmits the first encoded data associated with the footprint received. It is noted that, alternatively, the first encoded data may have been furnished some time ago and stored since then on the data storage means 32 of the client device 3.

In a step (c) the data processing means 31 of the client device 3 compute a first decoded data by application of a decoding process to said candidate information (DPS) representative of the appearance of said photograph and to said first encoded data received from the server 2.

As explained, the decoding process (and the encoding process) is such that said first decoded data correspond to the first random data RNGD if said candidate information representative of the appearance of said photograph matches the reference information representative of the appearance of said photograph. In other words, if the reference information and the candidate information are sufficiently close, the decoded value will correspond to the random value RNGD used to obtain said first encoded data SSKD.

In general, the result of a comparison of candidate information and reference information should show that they are identical, or at least have a distance less than a predetermined threshold of error. For example, for photograph-like graphic features, Digital Photo Seal-like security data match if they are different by less than 10%.

Thus, it is understood that the value of the first random data "masked" by the DPS can be recovered if the user has a photograph identical to the one used during the enrollment, from which the reference information is taken.

Step (c) further comprises the calculation of the cryptographic footprint of a first concatenation of the extracted optically readable data and of the first decoded data.

In other words, the client device 3 attempts to reconstitute the first footprint by performing the same first concatenation of the extracted optically readable data and of the first decoded data.

If:
- the extracted optically readable data matches the optically readable data used during enrollment; and
- the first decoded data matches the first random data RNGD;

then the first concatenation will give exactly the same result and the first footprint will again be reached.

In every other case, the entropy of the cryptographic hashing functions will cause a very different result to be reached. If document 1 has been altered (for example by replacing the photograph), then the respective candidate information and reference information will not match, a false value of the random feature will be obtained from the first footprint, and the authentication will be rejected.

At this stage, the client device 3 could simply send the first footprint computed in step (c) and leave the data processing means 21 of the server 2 to verify that it matches the one in its possession (i.e. to verify that a cryptographic footprint of a first concatenation of the extracted optically readable data and of the first decoded data matches the cryptographic footprint of the first concatenation of the optically readable data of the identity document 1 and first random data stored on the data storage means 22 of the server 2).

However, the proper value of the first footprint can be known, even from a previous authentication of the document 1. This is why the client device 3 will prove that it has obtained said first footprint correctly, i.e. from the identity document 1, and in a non-interactive way, that is, with only "one way" travel of information from the client device 3 to the server 2, and not "round-trip." Most importantly, as explained, the server 2 will not receive the first random data RNGD, nor the candidate information representative of the appearance of said photograph, nor the optically readable data (nor any data that would make it possible to get back to those data), although it is still possible for the server 2 to know with certainty that the first footprint has been correctly computed. Furthermore, none of the transmitted data are sensitive, and could be intercepted without resulting in a problem.

To that end, a cryptographic protocol is used for generating a "proof" of the calculation of said cryptographic footprint from the first concatenation of the extracted optically readable data and of the first decoded data, said proof revealing nothing other than the fact that the optically readable data and the first decoded data (i.e. the first random data RNGD) are truly in the possession of the producer of the proof. In other words, the cryptographic footprint is not simply possessed by the device 3, but also the data that are hashed in said cryptographic footprint.

The Pinocchio protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable calculation protocols for enabling the implementer to verifiably compute the application of any function and the order giver to verify the associated proof within a calculation time less than what is needed to perform the calculation itself.

In a step (d), the data processing means 31 of the client device 3, acting as proof entity, generate for this purpose a zero-knowledge proof of the calculation of said cryptographic footprint from the first concatenation of the extracted optically readable data and from the first decoded data, i.e. proof that the first cryptographic footprint has been effectively and correctly computed.

More specifically, said zero-knowledge proof guarantees the following statement: "given a cryptographic footprint H, there are optically readable data and a first random data RNGD (the decoded data) such that first concatenation thereof has said given cryptographic footprint H for footprint."

Thus, the supplied cryptographic footprint can be tied to the optically readable data and to the candidate information representative of the appearance of the photograph, but no information about the content of said data can be obtained. The cryptographic protocol provides a quick (less than half a second) proof to be verified and one that cannot be falsified: it is nearly impossible (probability of less than $\frac{1}{2}^{80}$, even less than $\frac{1}{2}^{128}$ depending on the parameters selected to produce the proof, the latter therefore being slower to produce) for a proof of the statement above to be accepted if the process is not carried out in accordance with specifications.

In producing the proof, the proof entity 3 uses the possibility of producing zero-knowledge proofs in order to conceal the data from the identity document 1. Thus, the proof provides no information about said data per se.

Later on it will be seen how the proof can be generated.

In a step (e), the client device 3 transmits said zero-knowledge proof generated in step (d) and the cryptographic footprint computed in step (c) to the server 2.

Thus, in a step (f), the data processing means 21 of the server 2 verify that the zero-knowledge proof is valid and that the received cryptographic footprint matches that of the first concatenation of optically readable data from said identity document 1 and from first random data that the server 2 possesses.

If the proof is not valid, it is because the first cryptographic footprint was not validly obtained, and therefore potentially the individual does not possess the identity document and is attempting to steal an identity. If the proof is valid but the received cryptographic footprint does not correspond to the one the verification entity 2 possesses, it is because the first decoded data does not correspond with the first random feature or the extracted readable data is not the original, i.e. the identity document 1 has been forged (by way of the photograph or the optically readable data). A fraudulent use alert can be issued.

If the first footprint is found and the proof is valid, the identity document 1 is valid, i.e. not falsified. Optionally, a descriptor associated with the first footprint can be consulted to obtain the status of the document 1: "OK," "Expired", "KO". For example, this status can define whether the holder of document 1 has the right to enter an area at the inlet at which the check is taking place.

If the status is OK he may enter, and if the status is Expired, he normally has the right to enter but needs to update his access. If the status is KO, it means that he has been recognized but has insufficient level of authorization.

Alternatively, whereupon the document 1 is successfully authenticated, the server 2 can transmit to the optional connected entity from which the individual wishes the authentication (for example a server carrying out a service as explained) an authorization, for example encrypted with a public key of the said entity (the authorization itself is typically a single-use token). Alternatively, such encrypted authorization can be transmitted to the client device 3, for retransmission to the connected entity, and decryption and verification by the latter. Such an embodiment is particularly advantageous because it allows complete confidentiality: not only does the server 2 not have access to the personal data of the individual, but in addition it has no contact with the connected entity from which the individual wishes authentication so that it is not even possible to know why the authentication is requested.

It should be noted that checking a register and/or the optional issuance of an access authorization can only be done if an authentication of the individual himself is completed, see below.

At this stage, the individual can be requested to furnish at least some personal data (called target personal data in the remainder of this disclosure), for example alphanumeric data to complete a registration if it is for authorizing access, or for filling out a form requested by the service carried out by the connected entity. The second concatenation will at present be able to be used in a clever way to automatically obtain these data.

To do this, in an optional additional step (g) (which may optionally be conditioned on a particular status, for example only if the individual has the right to go any farther, and/or on authentication of the individual), then the data processing means 21 transmit to the client device 3 for decryption (if it still does not have them) of at least one encrypted personal data of said individual stored on the data storage means 22 of the server 2. As explained, said decryption can be done by means of the cryptographic footprint of a second concatenation of the extracted optically readable data and of the decoded data.

Indeed, at this stage it is known that the decoded data corresponds to the random data and that the individual has been able to successfully reconstitute the first footprint on the client device 3. By changing only the concatenation (particularly by reversing the MRZ and the random feature), and by again applying the cryptographic hashing function, he can reconstitute the second footprint, which constitutes the private key of the personal data.

All or part of said data, at his request, can then be re-transferred to the server 2. It should be noted that it could be provided that the user be authorized to take advantage of this to update said personal data: for a change of address, for example, he modifies the data before re-encrypting them, and retransmitting all of them to the server 2 for storage.

It can easily be seen that, with such a solution, no sensitive data is stored on the server 2, nor is it transmitted from the client device 3 (only an unusable cryptographic footprint) and therefore an attack would compromise neither the security of the solution nor the personal data of the users.

Alternatives

Rather than furnishing the target personal data required in step (g), necessitating an additional interaction, the method can be simplified by furnishing said data at the same time as the proof in step (e). To do this, the zero-knowledge proof need only be adapted so that it is further a proof of the fact that at least one target personal data to be transmitted is properly selected from among personal data associated with the identity document 1.

Indeed, the proof can involve additional public parameters such as said target personal data.

According to a first embodiment, said target personal data is a fragment of the optically readable data, for example just the surname of the individual, i.e. it is extracted from the optically readable data, and the proof is thus a proof of said extraction. More precisely, the zero-knowledge proof can be proof of the following statement: "given a cryptographic footprint and a target personal data, there is an optically readable data and first random data RNGD (the first decoded data) such that:

the first concatenation thereof has said given cryptographic footprint for footprint, and the target personal data is extracted from the optically readable data."

According to a second mode, the optional encryption with a cryptographic footprint of a second concatenation of the optically readable data from the identity document 1 and from the first random data RNGD, different from the first concatenation, by at least one personal data of said individual is available from the beginning on the client device 3, or provided directly by the server 2 (for example in step (b), at the same time as the first encoded data). Indeed, this provision is not problematic due to the encryption.

At present, as explained, if the individual can successfully reconstitute the first footprint on the client device 3, he can reconstitute the second footprint, which constitutes the private key of the personal data, by only changing concatenation (in particular by reversing the MRZ and the first random data), and by applying the cryptographic hashing function again.

The zero-knowledge proof is then a proof of the fact that the target personal data came from encrypted personal data, i.e. It guarantees the following statement: "given a cryptographic footprint and a target personal data, there are optically readable data, first random data RNGD (the first decoded data) and encrypted personal data such that:

the first concatenation of the optically readable data and the first random data RNGD have said given cryptographic footprint for footprint, and said encrypted personal data is decrypted in said target personal data."

It is noted that other alternatives are possible, for example if the personal data to be transmitted is the photograph of the individual, and the skilled person will know how to adapt the proof case by case.

Generation of Proof

Preferably, said zero-knowledge proof is a cryptographic object like zkSNARK.

zkSNARK means "zero-knowledge Succinct Non Interactive ARgument of Knowledge", i.e. Argument of non interactive knowledge with zero divulgation of knowledge. It involves a cryptographic primitive constructed about the idea of proof. Researchers in theoretical computer science and cryptography have long been interested in the idea of proof. There are theoretical results allowing a very short, secure proof to be produced from an algorithm, but the time for producing such proof is out of reach and will remain so in spite of the increase in computing power of computers. One of the reasons stems from the power given to the entity that produces the proof, the client device 3 (also called the prover). In the theoretical results on proofs, the prover has infinite computing power and the proofs remain secure in spite of this.

The idea of proof was then relaxed, the protocol seeking only to protect itself from a prover that would have significant but limited computing power. The result of the protocol is no longer a proof but an argument. It is from this idea of argument that practical systems of verifiable calculation are constructed. An additional requirement in a system producing an argument is that said argument not be interactive: the verifier and the prover do not need to interact in order to produce the argument.

zkSNARKS have been presented since 2010: this involves arguments of short size (a few features of an elliptical curve), which do not need interactivity and which in addition enable the prover to perform a zero-knowledge proof, i.e. the proof does not contain any non-trivial information about the inputs furnished by the prover.

There are various protocols that specifically produce zkSNARKs, and the skilled person will be able to use them interchangeably in this method:

The Pinocchio protocol, already mentioned;

The Gepetto protocol, introduced in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015," which is an improvement of Pinocchio;

The protocol introduced in that and subsequent publications "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013," implemented open-source in the form of a library called libsnark, optimizing the protocol producing a zkSNARK in Pinocchio by improving the expressivity, i.e. the type of programs or algorithm that can be verified.

Taking the Pinocchio protocol as an example, it comprises a plurality of parts:

1. A conventional program is translated in the form of an arithmetic circuit, i.e. a set of relations between the inputs and outputs of the program that are translated solely by means of additions and multiplications of features of a finite body. It should be noted that in theory all the programs can be translated in this form, but only a portion of these programs allows effective translation into circuit form.

2. The arithmetic circuit obtained is represented effectively by means of three families of polynomials to which one additional polynomial is added, called target polynomial. These families of polynomials form "Quadratic Arithmetic Programs" (QAPs). They encode the relations between the inputs and outputs of each multiplication gate of the circuit, the relations of the addition gates being integrated into the first multiplication gate that follows in the calculation.

Said QAPs are connected to the verifiable calculation by the following point: a calculation y=C(x) is correct for an input x if and only if all the relations describing the corresponding arithmetic circuit are satisfied by setting x as input value and y as output value.

The QAPs in a way make it possible to compress all the constraints to be verified into a single relation to be verified: a polynomial constructed from the value x and three families of the QAP must divide the target polynomial.

3. A cryptographic protocol then takes a QAP as input associated with a program, generates evaluation and verification keys that use elliptical curves to conceal the polynomial relations. The polynomial proving that the calculation has been correctly performed is then computed directly by means of the relations concealed in the elliptical curve. The divisibility relation is translated only by means of a constant number of features of the elliptical curve, i.e. the proof is of constant size. The verification of said proof is extremely quick.

In addition, the protocol makes it possible to ensure that inputs from the calculation furnished by the prover are private: it enables the values of the prover to be concealed in the production of the proof by multiplying them by a multiple of the target polynomial, which does not change the fact that the "proof polynomial" is divisible by the target polynomial.

Said "proof" polynomial, whereupon it is concealed in an elliptical curve, constitutes a zkSNARK.

The Pinocchio protocol enables the zkSNARK that performs the proof to conceal some of the inputs of the calculation by which the proof is being done. In this case, it involves producing the following calculation: Input: the cryptographic footprint of the first concatenation of the extracted optically readable data and of the first decoded data, optionally personal data to be transmitted, and an initialization vector IV (and other public data if needed).

Private input: the extracted optically readable data and the first decoded data.

Output: the proof ττ that the prover truly knows the extracted optically readable data and the first decoded data, the concatenation whereof is hashed in the given cryptographic footprint, and optionally from which the personal data to be transmitted can be found.

It should be noted that protocols are known that are provided for the generation of a proof of proper operation of a hashing function, that the skilled person will be able to use directly even if they are not optimal. The difficulty is in obtaining a reasonable calculation time for producing the proof, and evaluation and verification key sizes that are not excessive.

the Zerocash protocol (IEEE Security & Privacy 2014) of Ben-Sasson et al., proposes the definition of an arithmetic circuit in order to verify the compression function of SHA-256, which includes about 30,000 multiplication gates. This offers a proof production time of about 5 seconds (per compression level, verifying the full hashing function, which comprises numerous iterations of the compression function, will clearly be longer), which remains high and significantly improvable;

the ZKBoo protocol, introduced in the publication "ZKBoo: faster zero-knowledge for Boolean circuits" by Giacomelli, Madsen and Orlandi (Usenix Security 2016) enables better performance (proof in 50 ms, verification in 70 ms) per iteration of the compression function, but the size of the proof is significant (800 Kb especially since it only seems to have been measured on an application of the compression function.

Currently, a light proof system is preferred, but for which the generation takes several seconds, so as to allow fast authentication.

Second Zero-Knowledge Proof

According to a particularly preferred embodiment, the present method also is a method of authentication of the individual, involving a comparison between a candidate biometric data and a reference biometric data.

It is assumed that the client device 3 has said candidate biometric data, and said second encoded data SSKT, or at least the reference biometric data.

As regards the "fresh" candidate biometric data, it can be obtained during the preliminary step (a). In other words, initially (i.e. upon completion of the enrollment step (a0)), the client device 1 may have absolutely no data.

It is important to understand that although the enrollment step (a0) can be carried out weeks before the implementation of the authentication, the step (a) is at worst carried out several minutes before the rest of the method, in order to guarantee the "freshness" of the candidate biometric data.

Thus, the step (a) advantageously comprises the generation of the candidate biometric data from a biometric trait furnished by the biometric acquisition means of the client device 3 (i.e. typically the optical acquisition means 30). This means for example that the individual first takes a photograph of his identity document 1, then a photograph of his face.

To guarantee the freshness of the candidate data, the step (a) may comprise the timestamping of the candidate biometric data by means of a timestamp.

The skilled person will know how to carry out such timestamping using known techniques, and advantageously a nonce (arbitrary number i.e. random number used once) is used as a timestamp.

Comparison of the biometric data can be done by the data processing means 21 of the server 2, but it is preferably done on the client device 3 in order to completely guarantee the privacy of the individual.

For this purpose, a cryptographic protocol can again be used generating a "proof" that the candidate biometric data and the reference biometric data match, said proof revealing nothing other than the fact that said biometric data are truly in the possession of the producer of the proof.

In other words, two zero-knowledge proofs are used:
the first proof is the proof of the calculation of the cryptographic footprint from a first concatenation of the extracted optically readable data and of the first decoded data;
the second proof is a proof of the fact that the candidate biometric data and the reference biometric data match.

It will be possible to use numerous zero-knowledge proofs, and particularly those proposed in the application FR17599292.

In a particularly preferred way, in the embodiment wherein there is a second encoded data SSKT obtained by application of a process of encoding reference biometric data and second random data RNGT, and a cryptographic footprint constructed from the second random data RNGT, a decoding process can be used to verify if the candidate biometric data and the reference biometric data match, in the same way as was done for the information like DPS information on the photograph.

Again, whereupon the encoding process used for the enrollment is an algorithm like the secure sketch algorithm, the decoding process is the recovery process of the same algorithm like a secure sketch algorithm, and the skilled person will be able to use other processes.

Mathematically, the decoding process gives, for a value of the second encoded data SSKT and for a candidate biometric data TempCand, "the value x=dec(SSKT, TempCand) such that there is a standard value ε less than a given threshold verifying SSKT=enc(x,TempCand+ε)" wherein x is equal to the value of the first random data RNGT if we have TempCand+ε=TempRef.

Thus, the implementation of the comparison comprises the calculation of a distance between the data, the definition whereof varies based on the nature of the biometric data considered. The calculation of the distance comprises the calculation of a polynomial between the components of the biometric data, and advantageously, the calculation of a scaler product.

For example, in a case where the biometric data have been obtained from images of an iris, a conventional distance used for comparing two data is the Hamming distance. In the case where the biometric data have been obtained from images of the individual face, it is common to use the Euclidean distance. This type of distance calculation is known to the skilled person and will not be disclosed in more detail.

Thus, the step (c) advantageously further comprises the calculation by the data processing means 31 of the client device 3 of:
- a second data decoded by application of a decoding process to said candidate biometric data and to the second encoded data (again, the encoded data is such that the said second decoded data correspond to the second random data RNGT if said candidate biometric data match the reference biometric data);
- a cryptographic footprint constructed from the second decoded data (it will be understood that said cryptographic footprint should be constructed in the same way as the third cryptographic footprint is constructed from the second random data RNGT, particularly the cryptographic footprint of a concatenation of the second random data RNGT and of the first cryptographic footprint).

Next, step (d) comprises the generation by the data processing means 31 of the client device 3 of the zero-knowledge proof of the fact that the candidate biometric data and the reference biometric data match, which in particular is a proof of the calculation of said cryptographic footprint from the second decoded data, said proof revealing nothing other than the fact that the second decoded data (i.e. the second random data RNGT) are truly in possession of the producer of the proof. Again, the proof is intended to guarantee that the third cryptographic footprint has actually been calculated, and it was done correctly.

More specifically, said zero-knowledge proof guarantees the following statement: "given a cryptographic footprint T, there is a second random data RNGT (and optionally optically readable data) such that a given function of said second random data RNGT has said given cryptographic footprint T as footprint." In the specific case where the third footprint is the cryptographic footprint of a concatenation of the second random data RNGT and of the first cryptographic footprint, the guarantee statement is the following: "given a cryptographic footprint T, there is a second random data RNGT and another cryptographic footprint H such that a concatenation of said second random data RNGT and of said other cryptographic footprint H has said given cryptographic footprint T as footprint."

The second zero-knowledge proof can be generated in the same way as the first zero-knowledge proof, see above.

Then, in step (e), the client device 3 additionally transmits to the server 2 said second zero-knowledge proof, and the new computed cryptographic footprint (the third footprint).

Thus, in the step (f), the data processing means 21 of the server 2 verify that the second zero-knowledge proof is valid, and that the received cryptographic footprint matches the one constructed from the second random data RNGT that the server 2 possesses.

If the proof is not valid, it is because the third cryptographic footprint was not obtained validly, and therefore there was no comparison between the candidate and reference biometric data, and identity theft is therefore potentially involved. If the proof is valid but the received cryptographic footprint does not match the one in possession of the verification entity 2, it is because the candidate biometric data does not match the reference biometric data, and therefore the individual is not the one expected, i.e. the authentication of the individual fails.

If the third footprint has been recovered and the proof is valid, it is because the identity of the individual is confirmed and other actions can take place (checking a descriptor, issuing authorization to the device 3 or a connected entity, supplying data of step (f), etc.).

It will be noted that instead of simultaneously carrying out the authentication of the document 1 and the authentication of the individual (i.e. using the same steps (a) to (f)), it is quite possible to carry out the methods one after the other, i.e. in steps (a') to (f') for the method implemented secondly (in particular the method of authentication of the individual, even though the reverse order is possible).

Server

According to a second aspect, proposed is the arrangement of the server 2 and the client device 3 that are connected, for the implementation of the method according to the first aspect, i.e. authentication of an identity document 1 of an individual and optionally authentication of said individual.

The client device 3 comprises data processing means 31 configured for:

Extracting, by analysis of an acquired image (in particular by optical acquisition means 30 of the client device 3) of the identity document 1 representing at least one photograph of an individual and optically readable data that are visible on said identity document 1:

candidate information representative of the appearance of said photograph as depicted in the acquired image;

said optically readable data as depicted in the acquired image;

Calculating:

a first data decoded by application of a decoding process to said candidate information representative of the appearance of said photograph and to the first encoded data, such that said first decoded data corresponds to first random data if said candidate information representative of the appearance of said photograph matches reference information representative of the appearance of said photograph, the server 2 possessing a cryptographic footprint of a first concatenation of said optically readable data from said identity document 1 and said first random data, called first cryptographic footprint;

a cryptographic footprint of a first concatenation of the extracted optically readable data and of the first decoded data;

optionally, a second decoded data by application of a decoding process to candidate biometric data and to the second encoded data, such that said second decoded data corresponds to the second random data if said candidate biometric data matches the reference biometric data;

and optionally, another cryptographic footprint constructed from the second decoded data in the same way as a third cryptographic footprint in possession of the server 2 is constructed from the second random data;

generating a zero-knowledge proof from the calculation of said cryptographic footprint from the first concatenation of the extracted optically readable data and from the first decoded data, optionally as well as a zero-knowledge proof from the calculation of said other cryptographic footprint from the second decoded data;

transmitting to the server 2 the zero-knowledge proof(s) and the computed associated cryptographic footprint(s);

as regards the server 2, it comprises data processing means 22 configured for verifying that:
  the zero-knowledge proof(s) is/are valid, and
  the received cryptographic footprint(s) match(es) (respectively) said first/third cryptographic footprint(s) in the possession of the server 2.

The client device 3 can further comprise biometric acquisition means, in particular the optical acquisition means 30, for acquisition of the candidate biometric data.

Computer Program Product

According to a third and a fourth aspects, the invention relates to a computer program product comprising coding instructions for execution (in particular on the data processing means 21 of the server 2 and the data processing means 31 of the client device 3) of a method according to the first aspect of the invention, as well as storage means readable by computer equipment (a memory 22 of the server 2 and a memory 32 of the client device 3) on which said computer program product is located.

The invention claimed is:

1. A method of authenticating an identity document implemented by a server and client device that are connected thereto; the client device comprising first processing means and the server comprising second processing means and
  the client device having first encoded data and an image acquired of an identity document representing at least a photograph of an individual and an optically readable data that are visible on said identity document, and the server having a cryptographic footprint of a first concatenation of the optically readable data of said identity document and of a first random data, called first cryptographic footprint;
  the method comprising the implementation by the first processing means of the steps of
(b) Extraction, by analysis of an image acquired from said identity document, of:
  candidate information representative of an appearance of the photograph as depicted in the acquired image;
  the optically readable data as depicted in the acquired image;
(c) Calculation of:
  a first decoded data by an application of a decoding process to the candidate information representative of the appearance of the photograph and to the first encoded data, such that the first decoded data corresponds to the first random data if the candidate information representative of the appearance of the photograph coincides to a reference information representative of the appearance of the photograph;
  a cryptographic footprint of a first concatenation of the extracted optically readable data and of the first decoded data;
(d) generation of a zero-knowledge proof of the calculation of the cryptographic footprint from the first concatenation of the extracted optically readable data and of the first decoded data;
the method comprising a step of
(e) transmission to the server of said zero-knowledge proof of the calculated cryptographic footprint; and comprises
(f) verification by the second processing means that:
  the zero-knowledge proof is valid, and
  the received cryptographic footprint coincides with the first cryptographic footprint possessed by the server.

2. The method according to claim 1, comprising a step (a) of preliminary acquisition of the image of the identity document representing at least a photograph of an individual and optically readable data that are visible on the identity document by optical acquisition means of the client device.

3. The method according to claim 2, wherein the client device initially has neither the first encoded data nor the acquired image of the identity document, the step (b) comprising a step of reception by the client device of the first encoded data from the server.

4. The method according to claim 1, wherein said zero-knowledge proof of the calculation of said cryptographic footprint from the first concatenation of the extracted optically readable data and of the first decoded data is a zero-knowledge proof of a fact that, given a cryptographic footprint, there is the optically readable data and the first random data such that the first concatenation thereof has said given cryptographic footprint for footprint.

5. The method according to claim 1, comprising a prior step (a0) of enrollment of data from said identity document comprising sub-steps of:
  (A) Obtaining the photograph of the individual visible on the identity document and of the optically readable data from the identity document;
  (B) Extracting by analysis of a photograph reference information representative of an appearance of the photograph of the individual;
  (C) Generating the first random data; calculating the first encoded data by application of an encoding process to the photograph reference information representative of the appearance of said photograph and to said first random data, and the first cryptographic footprint.

6. The method according to claim 5, wherein the step (a0) further comprises a sub-step (D) of storing on data storage means of the server the first encoded data and the first cryptographic footprint.

7. The method according to claim 1, the method further being a method of authentication of the individual, wherein the step (d) comprises the generation by the first processing means of the client device of a zero-knowledge proof of a fact that a reference biometric data and a candidate biometric data of the individual coincide; the step (e) comprising the transmission to the server of said zero-knowledge proof of the fact that the reference biometric data and the candidate biometric data of the individual coincide; and the step (f) comprising the verification by the second processing means of the server that the zero-knowledge proof of the fact that the reference biometric data and the candidate biometric data of the individual coincide is valid.

8. The method according to claim 7, wherein the client device has a second encoded data and the candidate biometric data of the individual, and the server has a cryptographic footprint constructed from a second random data, called a third cryptographic footprint; the step (c) comprising the calculation by the first processing means of the client device of:
  a second decoded data by an application of a decoding process to the candidate biometric data of the individual and to the first encoded data, such that the second decoded data corresponds to the second random data if the candidate biometric data of the individual coincide with the reference biometric data;
  the zero-knowledge proof of a fact that the reference biometric data of the individual and the candidate biometric data of the individual coincide being a zero-knowledge proof of the calculation of the cryptographic footprint from the first concatenation of the extracted optically readable data and of the first decoded data; the step (e) comprising the transmission to the server of the calculated cryptographic footprint; and the step (f)

comprising the verification by the second processing means that the received cryptographic footprint coincides with the third cryptographic footprint in the possession of the server.

9. The method according to claim 8, comprising a prior step (a0) of enrollment of data from said identity document comprising sub-steps of:
(A) Obtaining the photograph of the individual visible on the identity document and of the optically readable data from the identity document;
(B) Extracting by analysis of a photograph reference information representative of an appearance of the photograph of the individual;
(C) Generating the first random data; calculating the first encoded data by application of an encoding process to the photograph reference information representative of the appearance of said photograph and to said first random data, and the first cryptographic footprint wherein during the step (a0), the sub-step (A) or the sub-step (B) comprises obtaining the reference biometric data of the individual; and the sub-step (C) comprises the generation of the second random data and a calculation of the second encoded data by an application of the encoding process to the reference biometric data of the individual and to the second random data, and of the third cryptographic footprint.

10. The method according to claim 7, wherein the third cryptographic footprint is a cryptographic footprint of a concatenation of the second random data and the first cryptographic footprint.

11. The method according to claim 7, comprising a step (a) of preliminary acquisition of the image of the identity document representing at least a photograph of an individual and optically readable data visible on the identity document by optical acquisition means of the client device, wherein the step (a) comprises the generation of the candidate biometric data from a biometric trait furnished by biometric acquisition means.

12. The method according to claim 11, wherein the biometric acquisition means are the optical acquisition means of the client device, the client device being electronic equipment personal to said individual, the electronic equipment being a mobile terminal or chip card.

13. The method according to claim 1, wherein the decoding process is a process complementary to a process using a "secure sketch" algorithm.

14. The method according to claim 1, wherein the optically readable data of the identity document is a data as a Machine-Readable Zone (MRZ), a QR code, or a PDF417 data.

15. The method according to claim 1, wherein the step (f) further comprises the transmission to the server of a target personal data of the individual, the zero-knowledge proof of the calculation of said cryptographic footprint from the first concatenation of the extracted optically readable data and of the first decoded data as well a proof of the fact that the at least one target personal data to be transmitted is selected from among personal data associated with the identity document.

16. The method according to claim 15 in combination, wherein the target personal data is either extracted from the optically readable data, or from at least encrypted personal data.

17. The method according to claim 15, wherein the target personal data of the individual is an alphanumeric data associated with said individual, said photograph of the individual, said optically readable data, and said at least one alphanumeric data being printed on the identity document.

18. The method according to claim 1, wherein the client device further has an encryption with the cryptographic footprint of a second concatenation of the optically readable data from the identity document and of the first random data, different from the first concatenation, of at least one personal data of said individual, said second concatenation; the method comprising a decryption of the encryption of the at least one personal data of said individual, by means of the cryptographic footprint of the second concatenation of the extracted optically readable data and of the decoded data.

19. The method according to claim 1, wherein the reference information representative of an appearance of said photograph is a Digital Photo Seal type security data.

20. The method according to claim 1, wherein the zero-knowledge proof is at least a, zero-knowledge Succinct Non Interactive Argument of Knowledge (zkSNARK) type cryptographic object.

21. Non-transitory computer readable memory on a computer program product which comprises coding instructions for the execution of the method of claim 1 for authentication of an identity document.

22. An authentication arrangement comprising a server and a client device that are connected, characterized in that:
The client device comprises data processing means configured for:
Extracting, by analysis of an image acquired from an identity document representing at least a photograph of an individual and an optically readable data that are visible on said identity document:
candidate information representative of an appearance of said photograph as depicted in the acquired image;
said optically readable data as depicted in the acquired image;
Calculating:
a first decoded data by application of a decoding process to said candidate information representative of the appearance of said photograph and to the first encoded data, such that said first decoded data corresponds to a first random data if said candidate information representative of the appearance of said photograph coincides with reference information representative of the appearance of said photograph, the server having a cryptographic footprint of a first concatenation of said optically readable data from said identity document and said first random data, called first cryptographic footprint;
a cryptographic footprint of a first concatenation of the extracted optically readable data and of the first decoded data;
generating a zero-knowledge proof of the calculation of said cryptographic footprint from the first concatenation of the extracted optically readable data and of the first decoded data;
transmitting to the server said zero-knowledge proof and the calculated cryptographic footprint;
the server comprising data processing means configured for verifying that:
the zero-knowledge proof is valid, and
the received cryptographic footprint coincides with said first cryptographic footprint possessed by the server.

* * * * *